United States Patent
Tsuchida

(10) Patent No.: US 6,931,790 B2
(45) Date of Patent: Aug. 23, 2005

(54) SEALING STRUCTURE INCLUDING A WATER RECEIVER FOR AN AUTOMOBILE

(75) Inventor: Hideshi Tsuchida, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 10/695,136

(22) Filed: Oct. 28, 2003

(65) Prior Publication Data

US 2004/0168373 A1 Sep. 2, 2004

(30) Foreign Application Priority Data

Feb. 28, 2003 (JP) .......................... 2003-053482

(51) Int. Cl.[7] .................................................. E06B 7/14
(52) U.S. Cl. .............................. 49/408; 49/428; 49/440; 49/476.1
(58) Field of Search .......................... 49/408, 414, 428, 49/435, 440, 415, 416, 442, 443, 444, 476.1

(56) References Cited

U.S. PATENT DOCUMENTS

| | | | | |
|---|---|---|---|---|
| 3,153,265 A | * | 10/1964 | Hosea et al. ............... 49/476.1 |
| 3,198,572 A | * | 8/1965 | Stolarczyk .................. 296/201 |
| 4,817,336 A | * | 4/1989 | Kisanuki .................... 49/476.1 |
| 4,827,670 A | * | 5/1989 | Kogiso et al. .............. 49/476.1 |
| 4,919,471 A | * | 4/1990 | Seino et al. ................ 296/154 |
| 5,105,580 A | * | 4/1992 | Akachi et al. ............. 49/476.1 |
| 5,209,546 A | * | 5/1993 | Hasegawa et al. .......... 296/213 |
| 6,430,878 B2 | * | 8/2002 | Terasawa et al. ............. 49/416 |

* cited by examiner

Primary Examiner—Gregory J. Strimbu
(74) Attorney, Agent, or Firm—Flynn, Thiel, Boutell & Tanis, P.C.

(57) ABSTRACT

In a hardtop vehicle a partition and a glassrun are mounted at both sides of a center sash. The partition can receive a triangular glass of a front door and the glassrun can receive a front glass. The center sash has a die-molded portion with a thin tip end at an upper edge thereof. A roofside weatherstrip is provided. The partition, glass run and die-molded portion each include a water receiver composed of lip pieces extending along the vehicle interior side of the center sash. An opening at the upper end of each water receiver is positioned below the roofside weatherstrip when the door is closed. Each water receiver provides a clearance extending the length of the center sash and into the door below the belt line so that water discharges below the belt line.

9 Claims, 5 Drawing Sheets

SEALING STRUCTURE INCLUDING A WATER RECEIVER FOR AN AUTOMOBILE

FIELD OF THE INVENTION

The present invention relates to a sealing structure for an automobile. In particular a sealing structure that is capable of treating water invading between glass retaining members which partition door glass in a hardtop vehicle, etc., and an open-top vehicle, etc., (hereinafter merely called a "hardtop vehicle, etc.,"). For example, FIG. 6, shows a center sash 41 partitioning off triangular glass 2 of the front door 1 and the front glass 3, and a weatherstrip attached to a roof-side and resiliently brought into contact with the upper edge of the triangular glass 2 and the front glass 3.

BACKGROUND OF THE INVENTION

There are some types of vehicles in which the door glass of a window is composed of a plurality of glasses, one of which is a fixed type and the other of which is elevated for closing and lowered for opening. In such a vehicle, a partition to receive the side edge of a fixed glass and a glassrun to receive a side edge of elevating glass are mounted at a center sash which operates as a glass retaining member that partitions the respective glasses of a door. A weatherstrip is resiliently brought into contact with the upper edge of the respective glasses and is attached to the roofside.

FIG. 7 through FIG. 10 show one example of the above-described sealing structure. FIG. 7 shows an enlarged view of portion "7A" of the center sash 4 shown in FIG. 6. FIG. 8 is a view taken along the line 8—8 in FIG. 7 and FIG. 9 is a view taken along the line 9—9 in the same drawing.

The center sash 4 is made of metal or resin, and its section is roughly I-shaped as shown in FIG. 9. A partition 51 and a glassrun 61 are mounted in attaching recesses 4a and 4b at both sides of the center sash 41, respectively. The partition 51 is attached to the side edge of a triangular glass 2, and the side edge of an elevating front glass 3 is inserted into the glassrun 61.

Also, the center sash 41 has a resin-made die-molded portion 71, whose tip end is made thin, integrally formed on the upper end thereof, and the partition 51 is attached to the side edge of a triangular glass 2. At the same time, the side edge of the elevated front glass 3 is inserted into the other side in the glassrun 61.

In addition, with respect to triangular marks shown in FIG. 7, the solid delimit a die-molded portion thereabove. The whiteout portions indicate that an extrusion-molded portion is located therebelow. The arrangement is the same in the other drawings.

FIG. 10 shows roofside weatherstrip 91 attached to the open-edge portion of a door of a vehicle body. The weatherstrip 91 is composed of an attaching base portion 13 mounted at a holder 12 attached to a body panel 11. A hollow sealing portion 14 is integrally molded with the corresponding attaching base portion 13, and a lip 15 is resiliently brought into contact with the body panel 11 and covers a retainer 12. When the door 1 is closed, the upper edge of the triangular glass, the tip end portion of the die-molded portion and the upper edge of the elevated front glass are brought into contact with a sealing portion 14, wherein sealing is brought about. FIG. 10 shows a state where the tip end portion of the die-molded portion is brought into contact with the sealing portion 14. In FIG. 10, a lacing braid 16 is shown, which is provided integrally with the holder 12 and is brought into contact with the body panel 11.

The die-molded portion 71 at the upper end of the above-described center sash is made thin at the tip end portion as shown in FIG. 13. Nevertheless, the thickness of the die-molded portion 71 at its tip end portion is thicker than the thickness of the triangular glass 2 and front glass 3 as shown in FIG. 8, and is step-formed. Therefore, when the front door 1 is closed, as shown in FIG. 11, clearance $c_1$ is provided between the hollow sealing portion 14 of the roofside weatherstrip 91 and the triangular glass 2 or front glass 3, wherein water invades the clearance $c_1$.

In order to solve the problem, some countermeasures have been employed in the prior art, one of which has been to eliminate a gap between the sealing portion 14 and the triangular glass 2 or front glass 3 by making the tip end portion of the die-molded portion remarkably thin. Another countermeasure is to increase the adhesiveness of the tip end portion of the die-molded portion and sealing portion 14 by inserting a pad in the hollow sealing portion 14 when the door is closed.

Further, as shown in FIG. 12 and FIG. 13, another countermeasure was proposed, in which the roofside weatherstrip is formed by using a mold at the point at which the die-molded portion 7 of the upper end of the center sash is made to contact, a water receiver 18 is integrally formed at the die-molded portion 9a and receives water invading from the above-described clearance $c_1$, and water is discharged through a water draining port 19.

However, the respective countermeasures described above are not sufficient as countermeasures for treating water invading from clearance $c_1$. Further, as shown in FIG. 12 and FIG. 13, in the method for providing the water receiver 18, the appearance of the water receiver is not satisfactory when the door is opened. Since the point at which the die-molded portion 71 is made to contact at the upper end of the center sash is formed by using a mold, the number of processes in manufacturing a roofside weatherstrip 91 is increased, thereby resulting in an increase in production costs.

It is therefore an object of the present invention to provide a sealing structure for a vehicle, for which a countermeasure for treating water invading from the above-described clearance $c_1$ is employed.

SUMMARY OF THE INVENTION

In a vehicle which is the target of the present invention, a glass-retaining member such as, for example, a center sash 4 shown in FIG. 6, which partitions a door glass, is provided at a door. A partition attached to the side edge of the fixed glass and/or a glassrun through which the side edge of the elevating glass is passed are mounted at both sides of the glass-retaining member, and a die-molded portion whose tip end is made thin is integrally formed at the upper edge thereof. On the other hand, a roof side weatherstrip which carries out sealing is provided at the roofside. The upper edge of the glass and the die-molded portion at the upper edge of the above-described glass-retaining member are resiliently brought into contact with the roofside weatherstrip. A water receiver which goes along the glass-retaining member is continuously formed integrally at the above-described die-molded portion, the above-described partition and/or glassrun, and the opening at the upper end of the water receiver is directed to the clearance $c_1$ among or by the roofside weatherstrip, the die-molded portion at the upper edge of the above-described glass-retaining member, and the upper edge of the door glass when the door is closed. The lower end of the water receiver is opened in the door panel which is lower than the belt line.

According to the present invention, water invading from the above-described clearance passes through the water receiver and is caused to flow down in the door panel which is lower than the belt line, wherein invaded water can be securely discharged, and no water is accumulated in the water receiver. Therefore, it is not necessary to make the water receiver large so that accumulated water does not overflow. In addition, the partition and glassrun are usually extrusion-molded, and the water receiver can be simultaneously molded by extrusion molding. Also, in the case of molding, the water receiver can be integrally formed, wherein there is no need to additionally prepare a die molding process in order to mold the water receiver.

According to another invention, a weatherstrip has a lip piece, in which a water receiver is integrally formed with the partition and/or glassrun, and whose tip end is resiliently brought into contact with the door glass with clearance remaining between the same and glass.

According to the invention, since a part of the water receiver is composed of a door glass, the water receiver can be downsized, and can be further miniaturized, and sealing performance of the die-molded portion, partition and/or glassrun can be further improved.

Other features and effects of the present invention will be more clearly understood in the following detailed description of the embodiment by those skilled in the art. It must be, however, noted that the technical scope of the present invention is not limited to the embodiment and the accompanying drawings alone.

DESCRIPTION OF THE PREFERRED EMBODIMENT

Figure 7:
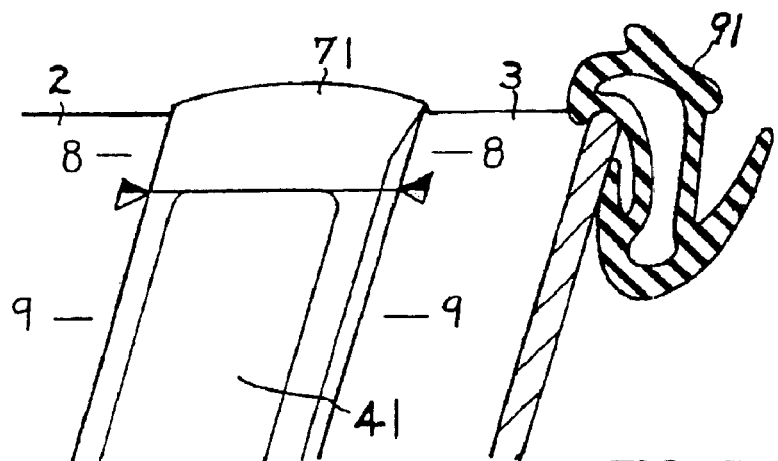
FIG. 7 is a front elevational view showing an upper end portion of a prior art center sash viewed from the exterior side of a vehicle.
Figure 8:
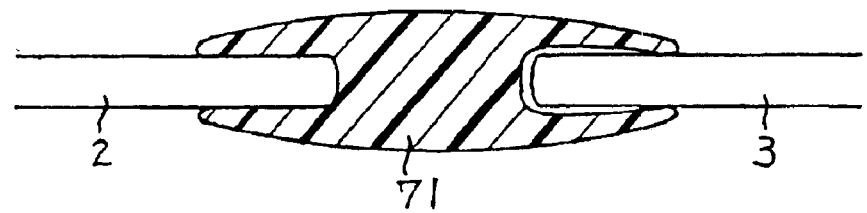
FIG. 8 is a sectional view taken along the line 8—8 in FIG. 7.
Figure 9:
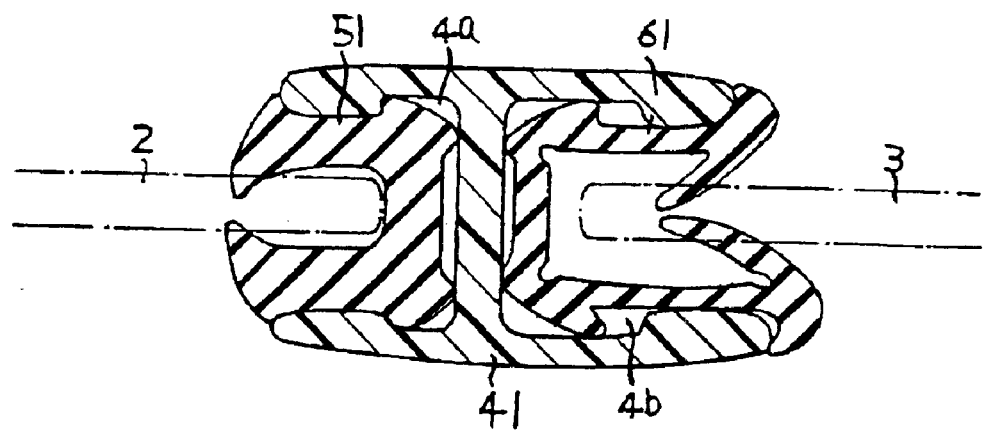
FIG. 9 is a sectional view taken along the line 9—9 in FIG. 7.
Figure 10:
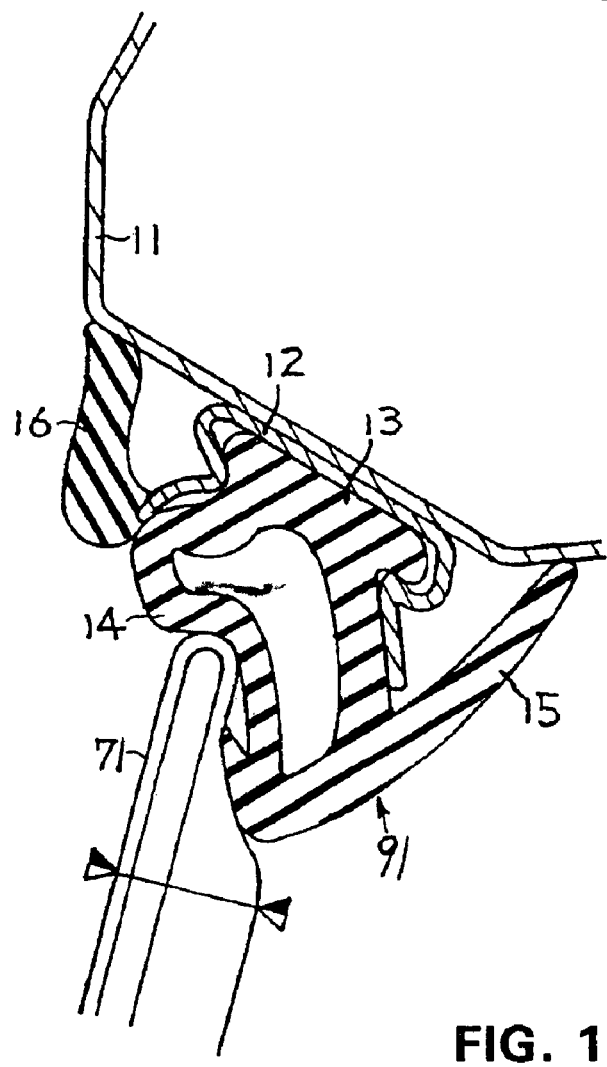
FIG. 10 is a sectional view of a roofside weatherstrip to which a die-molded portion at the upper end portion of the center sash is pressed by closing the door.

Hereinafter, a description is given of a sealing structure according to one embodiment of the present invention with reference to FIG. 1 through FIG. 5. In the drawings, parts that are the same as those in FIG. 7 through FIG. 9 are given the same reference numerals.

Figure 1:
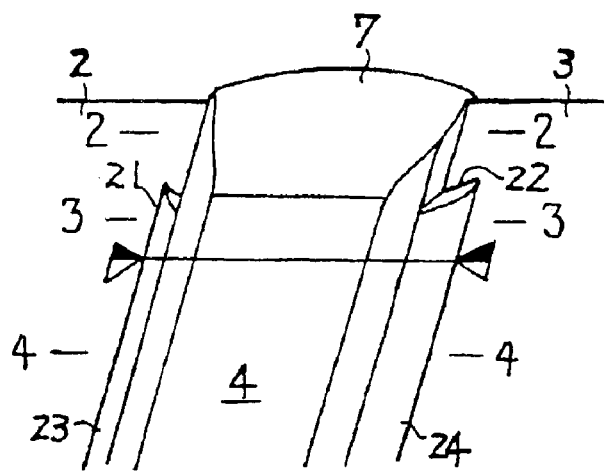
FIG. 1 is a front elevational view showing an upper end portion of the center sash according to the invention, which is observed from the interior side of a vehicle.
Figure 2:
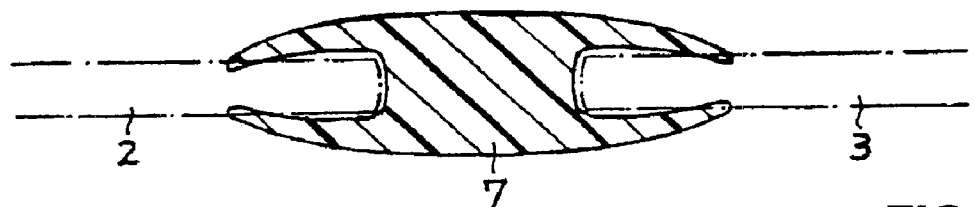
FIG. 2 is a sectional view taken along the line 2—2 in FIG. 1.
Figure 3:
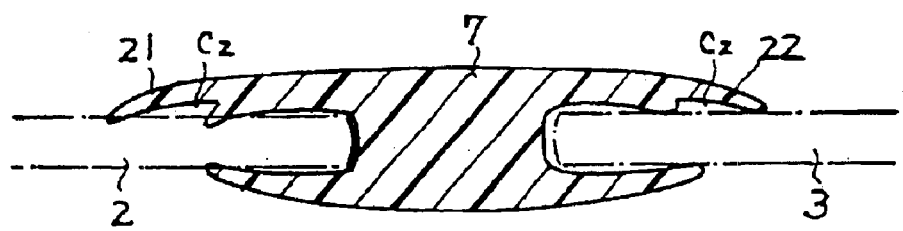
FIG. 3 is a sectional view taken along the line 3—3 in FIG. 1.
Figure 4:
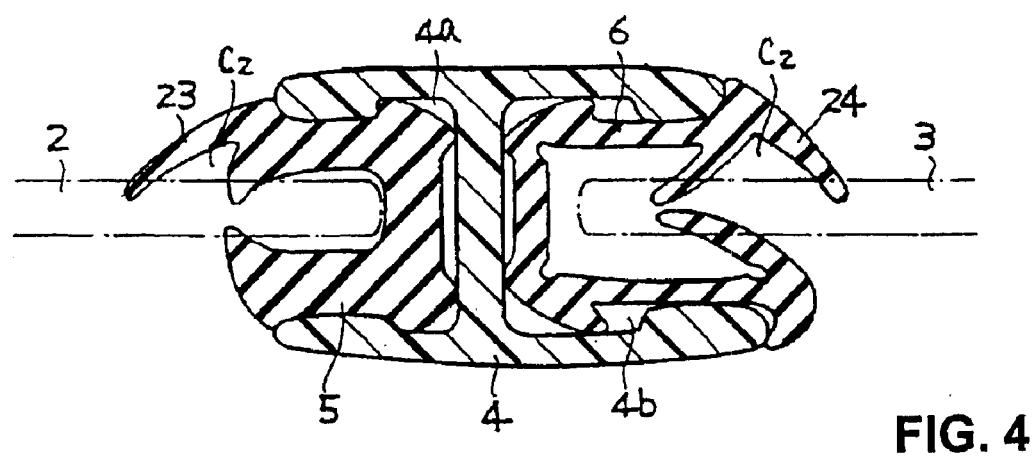
FIG. 4 is a sectional view taken along the line 4—4 in FIG. 1.
Figure 5:
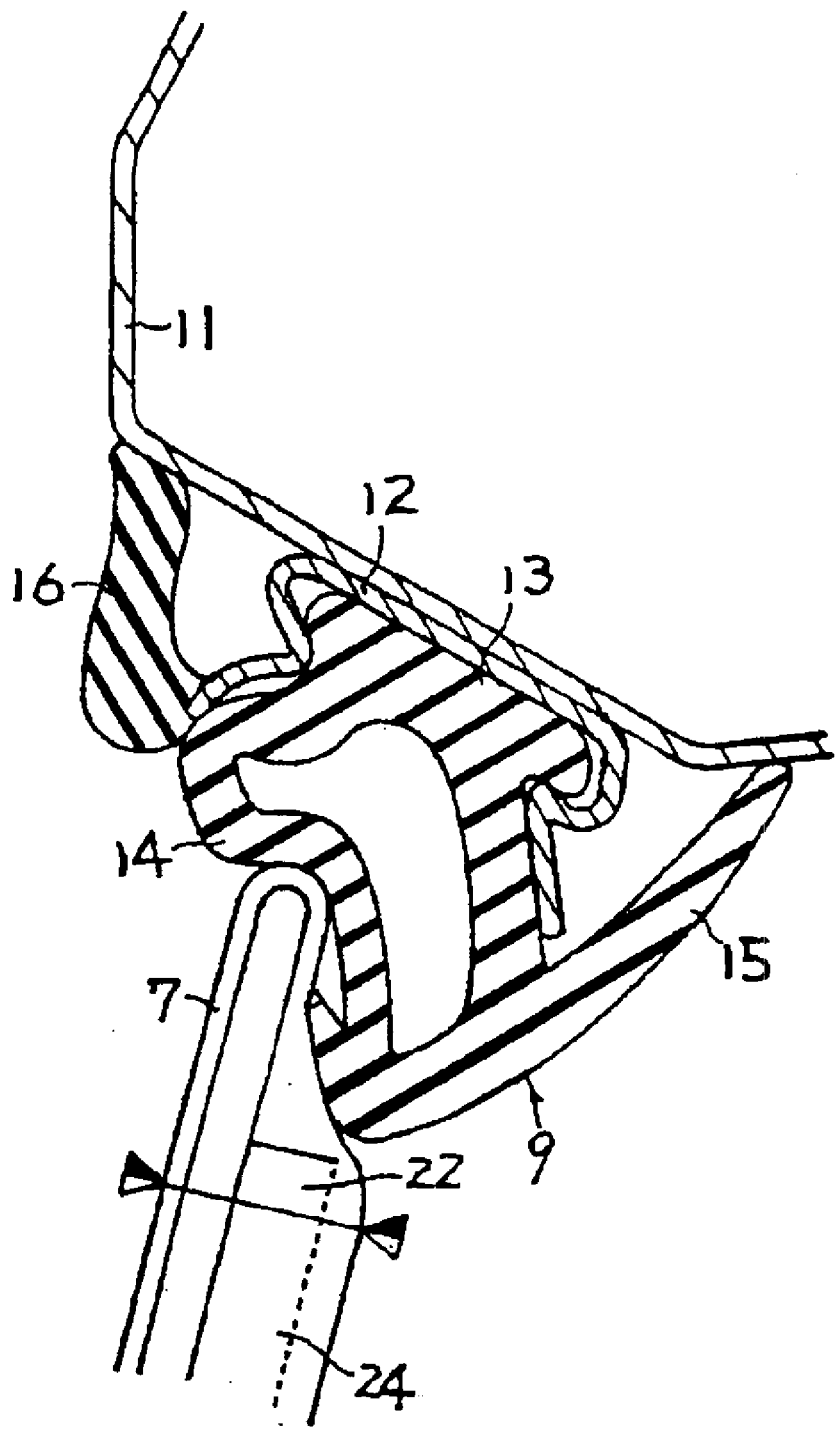
FIG. 5 is a side elevational view of the upper end portion of the center sash shown in FIG. 1.
Figure 6:
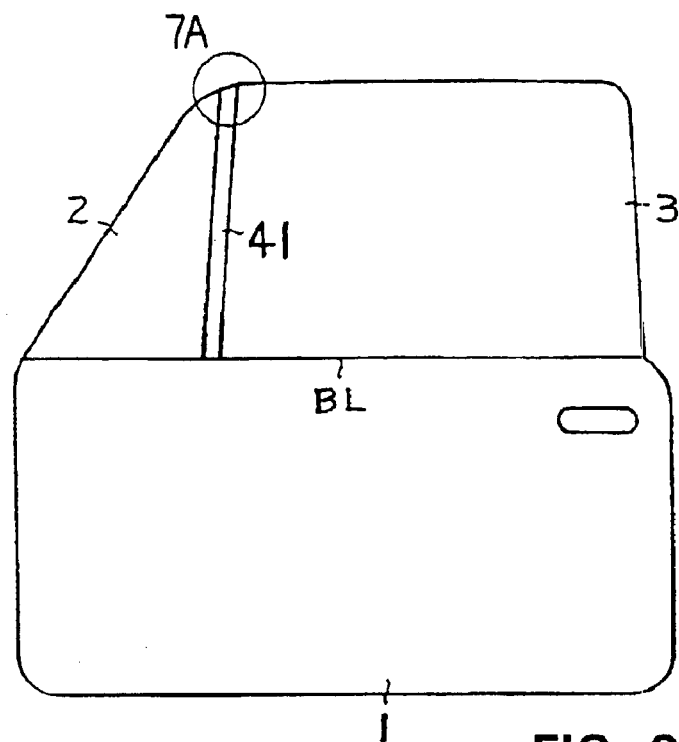
FIG. 6 is a front elevational view of a door for a vehicle.

FIG. 5 shows the side of the center sash 4 which operates as a glass-retaining member for retaining glass. Lip pieces 23 and 24 have tip ends that are resiliently brought into contact with a triangular glass 2 and a front glass 3. The lip pieces 23, 24 are integrally formed at the interior side of a vehicle body at a partition 5 and glassrun 6 along the center sash 4 with clearance remaining between the same and the triangular glass 2 and front glass 3 which compose a door glass. The lower ends of the lip pieces 23, 24 extend into the door to a location that is lower than the belt line BL of the front door 1 shown in FIG. 6.

At the die-molded portion 7 at the upper edge of the center sash 4, lip pieces 21 and 22 that compose a water receiver along with the above-described lip pieces 23 and 24 are continuously formed integrally with the lip pieces 23 and 24 of the partition 5 and glassrun 6 at the left and right sides at the interior side of the vehicle body. The upper ends of the lip pieces 23, 24 are positioned below the roofside weatherstrip 9, as shown in FIG. 5, when the door is closed, and are composed so as to surround the clearance $c_1$, shown in FIG. 11, which is produced by the differential gap formed by the die-molded portion 7, triangular glass 2 and front glass 3, and the roofside weatherstrip 9.

Figure 11:
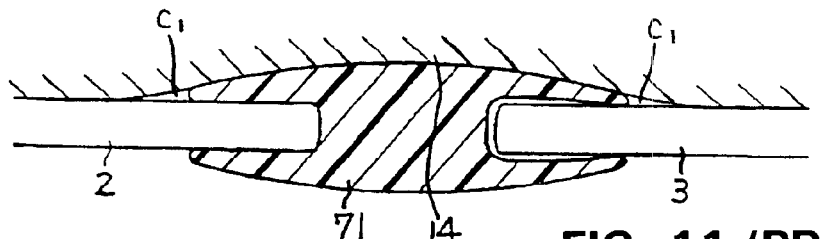
FIG. 11 is a view showing a state where clearance $c_1$ is formed between a roofside weatherstrip and triangular glass and/or front glass.
Figure 12:
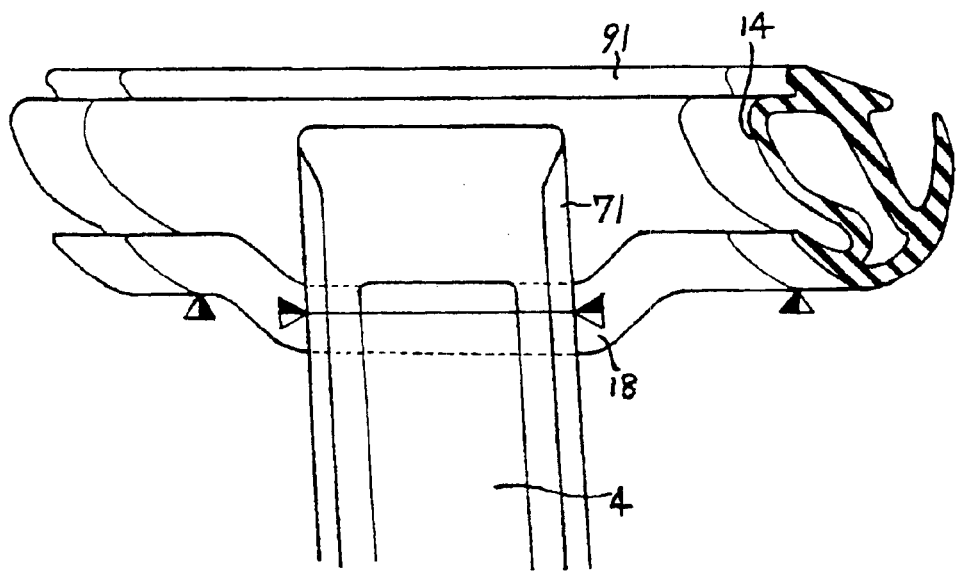
FIG. 12 is a front elevational view showing the die-molded portion of a weatherstrip to which the die-molded portion is fitted.
Figure 13:
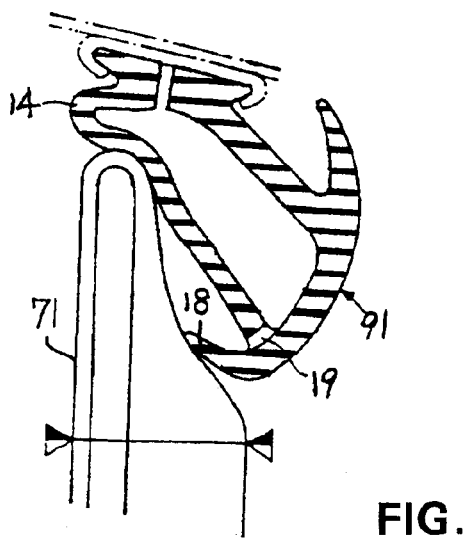
FIG. 13 is a longitudinal sectional view showing the die-molded portion of a weatherstrip to which the die-molded portion is fitted.

With the sealing structure according to the present embodiment, water that invades through the clearance $c_1$ shown in FIG. 11 passes through clearance $c_2$ (FIG. 3) between the lip pieces 21 and 22, which compose a water receiver, and the triangular glass 2 and front glass 3, and clearance $c_2$ (FIG. 4) between the lip pieces 23 and 24 and the triangular glass 2 and front glass 3, and is discharged into the door.

The above-described embodiment shows an example in which the partition 5 and glassrun 6 are provided at both sides of the center sash 4. However, in another embodiment, only the partition 5 may be provided at both sides of the center sash or only the glassrun 6 may be provided thereon.

In the above-described embodiment, an example in which the sealing structure is applied to a hardtop vehicle is shown. However, the sealing structure may be applicable to the center sash of an open-top vehicle as well.

In addition, in the above-described embodiment, although the glass and the partition are separately prepared, the glass and partition may be integrally formed.

What is claimed is:

1. A sealing structure for a vehicle comprising:

a glass retaining member, the glass retaining member including a partition portion and a die-molded portion, the partition portion receiving a side edge of a fixed glass at one side thereof and receiving a glassrun at an opposing side thereof, a side edge of an elevating glass being movable within the glassrun, the die molded portion having a narrow tip end integrally formed therewith at an upper edge thereof;

a roof weatherstrip for resiliently contacting an upper edge of the elevating glass and the tip end of the die-molded portion; and a water receiver extending along the glass retaining member and integrally formed with the die-molded portion, the partition portion and the glassrun, the water receiver including an opening at an upper end thereof being in fluid communication with a clearance formed between the roof weatherstrip, the upper edge of the die-molded portion and the upper edge of the elevating glass, wherein a lower end of the water receiver opens into a door below a belt line of the door.

2. The sealing structure for a vehicle as set forth in claim 1, wherein the water receiver is formed by lip pieces of the die-molded portion, partition portion and glass run, the lip pieces including tip ends for resiliently contacting the elevating glass with a clearance between the lip pieces and the elevating glass.

3. A sealing structure for a vehicle door having a first front glass, a second glass and a beltline below said first front glass and said second glass, said sealing structure comprising:
- a glass-retaining member for positioning between said first glass and said second glass, a lower end of said glass-retaining member adapted to be located at the beltline of the vehicle door and an upper end of said glass-retaining member for being located at a roofside portion of the door, said glass-retaining member comprising:
- a center sash comprising:
  - a die-molded portion having a tapered portion at an upper end thereof, said die-molded portion of said center sash having a first recess that opens in a first direction for receiving the first glass and a second recess that opens in a second direction opposite from the first direction for receiving the second glass, each said recess being defined by an inner projection for an interior side of the vehicle door and a parallel outer projection for an outer side of the door, each projection for contacting a respective side of a respective one of said first and second glass;
- the inner projection defining the first recess comprising a first lip piece having a distal end portion, for contacting the distal end portion of the first glass, the first lip piece providing a first water receiver defined by the inner side of an first lip piece, the first water receiver adapted to define a clearance between the first water receiver and the first glass an upper end of the first water receiver defining an opening for receiving water being spaced a predetermined distance from the upper end of said die-molded portion;
- the inner projection defining the second recess comprising a second lip piece having a distal end portion for contacting the second glass, the distal end portion of the second lip piece providing a second water receiver defined by an inner side of the second lip piece, the second water receiver adapted to define clearance between the second water receiver and the second glass, an upper end of the second water receiver defining an opening for receiving water being spaced the predetermined distance from the upper end of said die-molded portions.

4. A sealing structure in combination with a vehicle door having a first front glass, a second glass and a beltline located below said first front glass and said second glass, said sealing structure comprising:
- a center sash positioned between said first glass and said second glass, a lower end of said center sash being secured at the beltline to the vehicle door and an upper end of said center sash being located at a roofside weatherstrip adjacent an upper portion of the door when the door is in a closed position, said center sash having a first recess opening in a first direction and extending along a length thereof and a second recess opening in a second opposing direction and extending along the length thereof;
- a partition inserted into the first recess of said center sash and having a first front glass receiving opening along a length of the partition, the receiving opening receiving a side edge of the first front glass, said partition further comprising a partition lip piece projecting along a vehicle interior side of said front glass and including a distal end portion defining a water receiver extending along the length of the partition and forming a clearance with the first front glass;
- a glass run inserted into the second recess of the center sash and having a second glass receiving opening along a length of the glass run, the receiving opening receiving a side edge of the second glass, the glass run further comprising a glass run lip piece projecting along a vehicle interior side of the second glass and including a distal end portion defining a water receiver extending along the length of the glass run and forming a clearance with the second glass;
- wherein the center sash includes a die-molded portion at the upper end thereof, the die-molded portion including a first die-molded lip piece having a distal end forming a water receiver having an opening at the upper end of the center sash, and the die-molded portion includes a second die-molded lip piece having a distal end forming a water receiver having an opening at the upper end of the center sash, and
- the water receivers provide paths for water from the openings to a location below the belt line of the vehicle door.

5. The sealing structure in combination with a vehicle door of claim 4, wherein the center sash and the first front glass and the second glass are pivotable with the vehicle door, the first glass being fixed to the vehicle door and the center sash.

6. The sealing structure in combination with a vehicle door of claim 4, wherein the second glass comprises a window retractable into the vehicle door.

7. The sealing structure in combination with a vehicle door of claim 4, wherein the roofside weatherstrip is provided for contacting the first and second glass when the vehicle door is in the closed position.

8. The sealing structure in combination with a vehicle door of claim 7, wherein gaps are provided between the weather strip respective and the respective lip pieces.

9. The sealing structure in combination with a vehicle door of claim 4, wherein the die-molded lip pieces do not extend to a top edge of the center sash.

* * * * *